US010642645B2

(12) United States Patent
Filgueiras et al.

(10) Patent No.: US 10,642,645 B2
(45) Date of Patent: May 5, 2020

(54) NETWORK MODE CONFLICT RESOLUTION

(71) Applicant: Microsoft Corporation, Redmond, WA (US)

(72) Inventors: Henrique Filgueiras, Kirkland, WA (US); Mitesh Desai, Sammamish, WA (US); Mahmoud Elhaddad, Newcastle, WA (US); Mingtzong Lee, Woodinville, WA (US); Yesayi Hovnanyan, Redmond, WA (US); Mukund Sankaranarayan, Sammamish, WA (US); Nar Ganapathy, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 479 days.

(21) Appl. No.: 13/924,357

(22) Filed: Jun. 21, 2013

(65) Prior Publication Data
US 2014/0379883 A1 Dec. 25, 2014

(51) Int. Cl.
G06F 9/48 (2006.01)
H04W 4/50 (2018.01)
H04L 12/24 (2006.01)

(52) U.S. Cl.
CPC ............ G06F 9/48 (2013.01); H04L 41/0869 (2013.01); H04L 41/18 (2013.01); H04W 4/50 (2018.02)

(58) Field of Classification Search
USPC .................................................. 709/223, 224
See application file for complete search history.

(56) References Cited

U.S. PATENT DOCUMENTS

| 6,295,518 | B1 | 9/2001 | Mclain et al. |
| 7,295,528 | B2 | 11/2007 | Ibrahim et al. |
| 2004/0106401 | A1* | 6/2004 | Ormson ............... H04W 36/30 455/423 |
| 2004/0218580 | A1 | 11/2004 | Bahl et al. |

(Continued)

FOREIGN PATENT DOCUMENTS

| CN | 101061645 A | 10/2007 |
| CN | 101667141 A | 3/2010 |
| WO | 2007048653 A | 5/2007 |

OTHER PUBLICATIONS

Berg, Johannes., "Wi-Fi Peer-to-Peer on Linux", Retrieved at <<http://pdxplumbers.osuosl.org/2010/ocw/system/presentations/639/original/Ipc-p2p.pdf>>, Nov. 2010, pp. 15.

(Continued)

Primary Examiner — Hermon Asres
(74) Attorney, Agent, or Firm — David Chin; Chin IP, PLLC

(57) ABSTRACT

Technology for managing operational modes of a network adapter is disclosed. The technology includes features for selectively preempting (e.g., canceling, suspending, deferring, pausing, changing to a "no-op" state, changing to a passive state, or otherwise deprioritizing) execution for a current operational mode of the network adapter, executing a requested network control operation, and optionally restoring the preempted operational mode. The operational mode may be selectively preempted based on priority information associated with the current operational mode and the requested network control operation.

20 Claims, 9 Drawing Sheets

(56) References Cited

U.S. PATENT DOCUMENTS

| | | | |
|---|---|---|---|
| 2004/0223469 A1* | 11/2004 | Bahl | H04W 88/06 370/331 |
| 2005/0239497 A1 | 10/2005 | Bahl et al. | |
| 2005/0246431 A1* | 11/2005 | Spitaels | H04L 12/4625 709/222 |
| 2006/0111045 A1* | 5/2006 | Orlassino | H04W 76/14 455/41.2 |
| 2007/0047567 A1 | 3/2007 | Suzuki | |
| 2008/0151767 A1 | 6/2008 | Moran et al. | |
| 2009/0254924 A1 | 10/2009 | Anirudh et al. | |
| 2010/0069006 A1* | 3/2010 | Baek | H04L 41/5022 455/41.3 |
| 2010/0069112 A1 | 3/2010 | Sun et al. | |
| 2010/0180016 A1 | 7/2010 | Bugwadia et al. | |
| 2011/0149797 A1* | 6/2011 | Taaghol | H04L 12/5692 370/254 |
| 2011/0167285 A1 | 7/2011 | Mehta et al. | |
| 2011/0231853 A1 | 9/2011 | Murray et al. | |
| 2011/0286437 A1 | 11/2011 | Austin et al. | |
| 2012/0002567 A1 | 1/2012 | Sun et al. | |
| 2012/0158839 A1 | 6/2012 | Hassan et al. | |
| 2013/0065627 A1 | 3/2013 | Jung et al. | |
| 2013/0100944 A1 | 4/2013 | Kwon et al. | |
| 2013/0215846 A1 | 8/2013 | Yerrabommanahalli et al. | |
| 2016/0073333 A1* | 3/2016 | Wei | H04W 48/18 455/552.1 |

OTHER PUBLICATIONS

Yang, et al., "RF Concurrency Performance Study for Integrated WiFi Radio", Retrieved at <<http://www-mobile.ecs.soton.ac.uk/home/conference/Globecom_10/DATA/02-145-06.PDF>>, In IEEE Global Telecommunications Conference, Dec. 6, 2010, pp. 5.
Camps-Mur, et al., "Device to Device Communications with WiFi Direct: Overview and Experimentation", Retrieved at <<http://enjambre.it.uc3m.es/~agsaaved/papers/2012_camps_wircommag.pdf>>, In IEEE Wireless Communications Magazine, 2012, pp. 8.
"Optimized Unified Communications Performance on Wi-Fi", Retrieved at <<http://www.arubanetworks.com/pdf/solutions/EB_MobileUC.pdf>>, 2012, pp. 3.
Kumar, Mugunth., "iOS Framework: Introducing MKNetworkKit", Retrieved at <<http://blog.mugunthkumar.com/products/ios-framework-introducing-mknetworkkit/>>, Nov. 29, 2011, pp. 14.
"The System Intelligence that Sets Meru Apart", Retrieved at <<http://www.merunetworks.com/products/system-director-os/index.html>>, 2012, pp. 2.
"OfficeScan Endpoint Protection for Physical and Virtual Desktops", Retrieved at <<http://www.trendmicro.com/us/enterprise/product-security/officescan/index.html>>, Retrieved date: Mar. 6, 2013, pp. 2.
"Virtual Cells: The Only Scalable Multi-Channel Deployment", Retrieved at <<http://me.westcon.com/documents?documentId=36960&filename=Virtual_Cell_White_Paper.pdf>>, In White Papers of MERU Networks, Aug. 21, 2009, pp. 8.
Xia, et al., "Virtual WiFi: Bring Virtualization from Wired to Wireless", Retrieved at <<http://v3vee.org/papers/vee11-wifi.pdf>>, In Proceedings of the 7th ACM SIGPLAN/SIGOPS International Conference on Virtual Execution Environments, Mar. 9, 2011, pp. 12.
International Search Report/Written Opinion dated Feb. 17, 2014, in PCT App. No. PCT/US2013/060253, 11 pages.
International Search Report; PCT App. No. US2013/060252, dated Mar. 5, 2014; 11 pages.
Non-Final Office Action dated Apr. 27, 2016 in U.S. Appl. No. 13/924,386, 30 pages.
Non-Final Office Action dated Oct. 21, 2016 in U.S. Appl. No. 13/924,386, 31 pages.
Non-Final Office Action dated Sep. 19, 2017 in U.S. Appl. No. 13/924,386, 32 pages.
Intention to Grant dated Jan. 27, 2017, in EP App. No. 13779428.5, including attachments, 42 pages.
Non-Final Office Action dated May 9, 2017 in U.S. Appl. No. 13/924,386, 31 pages.
"First Office Action and Search Report Issued in Chinese Patent Application No. 201380077646.3", dated Feb. 5, 2018, 9 Pages.
Final Office Action dated May 7, 2018 in U.S. Appl. No. 13/924,386, 32 pages.
"Non Final Office Action Issued in U.S. Appl. No. 13/924,386", dated Dec. 18, 2018, 32 Pages.
"Final Office Action Issued in U.S. Appl. No. 13/924,386", dated Jun. 11, 2019, 31 Pages.

* cited by examiner

| Priority | Network Control Operation |
|---|---|
| 0 | Enable wireless radio (e.g., turn off "airplane mode") |
| 0 | Disable wireless radio (e.g., turn on "airplane mode") |
| 1 | Disconnect from network |
| 1 | Disable SoftAP or a Wi-Fi Direct Group Owner functionality |
| 2 | Negotiate connection |
| 3 | Connect to network |
| 3 | Start SoftAP or a Wi-Fi Direct Group Owner functionality |
| 4 | Scan infrastructure networks |
| 4 | Discover peer devices |

Table 1: Example Priority Values

*FIG. 4*

| Requested Network Control Operation (NCO) | Current Operational Mode (COM) | | |
|---|---|---|---|
| | High Reliability Mode | Discoverable Mode | Low Latency Mode |
| Scan/Discovery Request | Delay NCO | Preempt COM | Preempt COM |
| Connect to Infrastructure Network | Delay NCO | Preempt COM | Preempt COM |
| Disconnect from Infrastructure Network | Delay NCO | Preempt COM | Preempt COM |
| Start Wi-Fi Direct Group Owner or SoftAP functionality | Delay NCO | Preempt COM | Preempt COM |
| Stop Wi-Fi Direct Group Owner or SoftAP functionality | Delay NCO | Preempt COM | Preempt COM |
| Connect to Wi-Fi Direct Network | Delay NCO | Preempt COM | Preempt COM |
| Disconnect from Wi-Fi Direct Network | Delay NCO | Preempt COM | Preempt COM |
| Respond to Wi-Fi Direct Connection Negotiation | Preempt COM | Preempt COM | Preempt COM |
| Initiate Wi-Fi Direct Connection Negotiation | Delay NCO | Maintain COM and initiate NCO | Preempt COM |

Table 2: Example Operational Mode Preemption Rules

*FIG. 5*

NETWORK MODE CONFLICT RESOLUTION

BACKGROUND

Users, applications, or other entities may initiate requests for network control operations (e.g., operations that manage, configure, or otherwise control a network adapter or that control interfacing of a computing device to a network or other device). In some situations, a network adapter (i.e., a network interface card or a network controller) may not be able to execute a requested network control operation on receipt of the request. For example, such a condition may occur if the requested network control operation would conflict with a current operational mode of the network adapter, would conflict with an executing network control operation, or would conflict with another requested network control operation.

Entities, especially users, may have certain expectations with respect to execution of requested network control operations. For example, a user may be dissatisfied if a requested network control operation is not executed in a timely manner or may incorrectly believe that his or her computing device is defective if a requested network control operation is delayed or canceled due to a conflict. However, blindly executing network control operations without considering the current operational mode of the network adapter, other executing network control operations, or other requested network control operations may lead to reliability and performance problems such as dropped connections, violation of connection quality requirements, or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology for managing operational modes of a network adapter is disclosed. The technology includes features for selectively preempting (e.g., canceling, suspending, deferring, pausing, changing to a "no-op" state, changing to a passive state, or otherwise deprioritizing) execution for a current operational mode of the network adapter, executing a requested network control operation, and optionally restoring the preempted operational mode. The operational mode may be selectively preempted based on priority information associated with the current operational mode and the requested network control operation.

As one non-limiting example, the disclosed technology may be employed to enable certain requested network control operations to selectively preempt a current operational mode of the network adapter in favor of the requested network control operation. In such an example, this preemption may enable faster completion of a user initiated network control operation, thus providing an appearance of responsiveness to user input. Further, the technology may also limit reliability and performance impacts by restoring the preempted operational mode following completion of network control operation that triggered the preemption. While this technology may be particularly useful in virtualized networking environments, aspects of the technology may be employed in a wide variety of virtualized and non-virtualized networking systems.

Other aspects of and applications for the disclosed technology will be appreciated upon reading and understanding the attached figures and description.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein:

FIG. 4 is a priority value table for network control operations of one implementation of technology;

FIG. 5 is a table of preemption rules for operational modes of one implementation of the technology;

DETAILED DESCRIPTION

Figure 1:
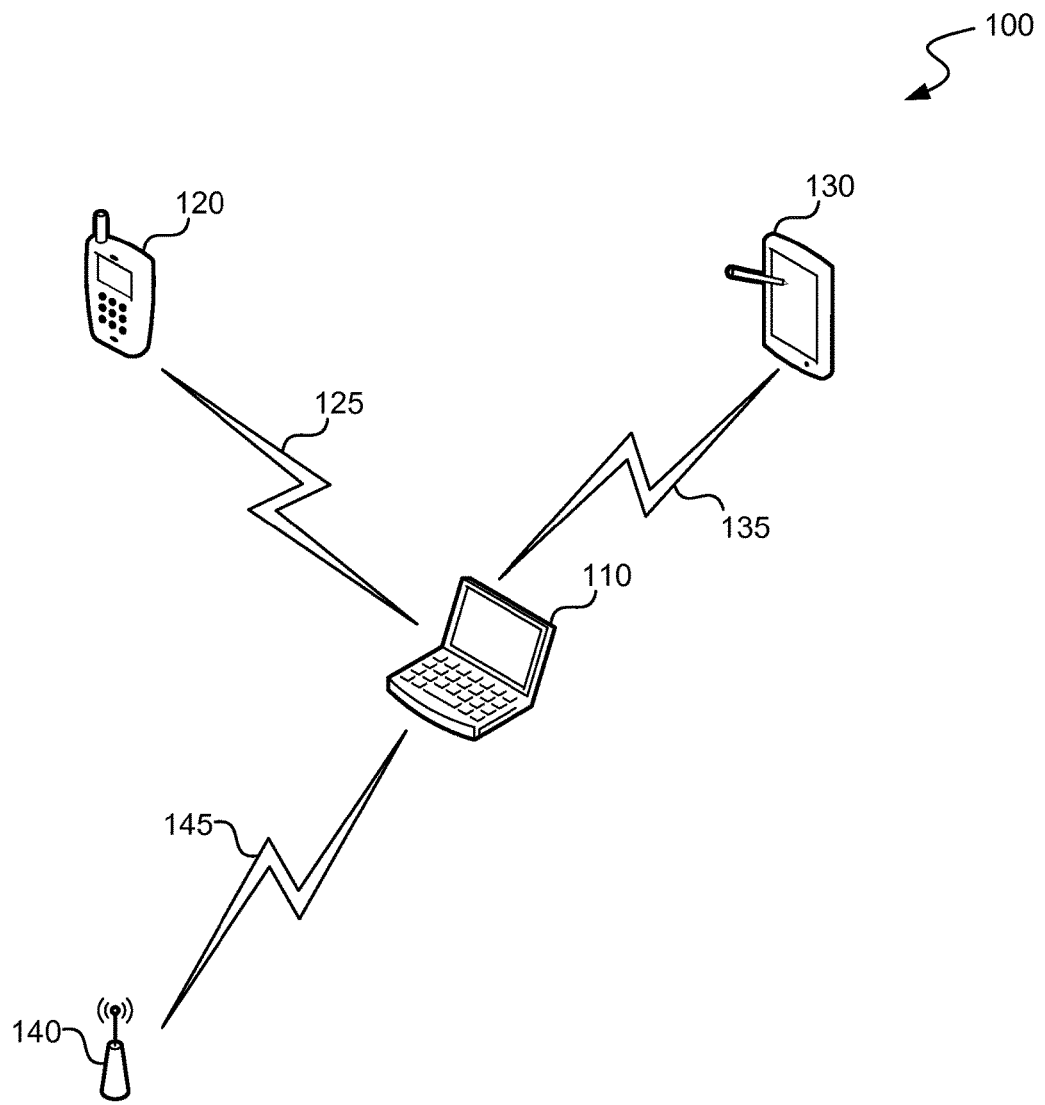
FIG. 1 is a diagram illustrating one example of a suitable environment in which aspects of the technology may be employed.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof.

Introduction

Technology for managing operational modes of a network adapter is disclosed. The technology includes features for selectively preempting (e.g., canceling, suspending, deferring, pausing, changing to a "no-op" state, changing to a passive state, or otherwise deprioritizing) execution for a current operational mode of the network adapter, executing a requested network control operation, and optionally restoring the preempted operational mode. The operational mode may be selectively preempted based on priority information associated with the current operational mode and the requested network control operation.

As one non-limiting example, the disclosed technology may be employed to enable certain requested network control operations to selectively preempt a current operational mode of the network adapter in favor of the requested network control operation. In such an example, this preemption may enable faster completion of a user initiated network control operation, thus providing an appearance of responsiveness to user input. Further, the technology may also limit reliability and performance impacts by automatically restoring the preempted operational mode following completion of the network control operation that triggered the preemption.

The disclosed technology may be employed, for example, in a computing device that hosts multiple virtual adapters. These virtual adapters may be individually configured to interface with any one or more networks via a shared wireless radio and may facilitate both peer-to-peer connection(s) and infrastructure connection(s) over a single underlying network adapter. In this example, the technology may be employed to manage execution of operational modes and network control operations for the multiple virtual adapters. For example, such management may help limit or resolve conflicts between operational modes and requested network control operations and result in improved performance and reliability for the multiple virtual adapters. In addition, such management may enable faster completion of requested network control operations.

To accomplish these and other benefits, the disclosed technology may be employed to allow user initiated network control operations to preempt operational modes that may consume a relatively large amount of radio or other network adapter resources for a relatively lengthy duration. As one specific example, the technology includes features for allowing preemption of a Wi-Fi Direct listening state by a user initiated request to connect to a wireless network. In this example, the Wi-Fi Direct listening state may be automatically restored to its prior state once the computing device is connected to the wireless network. As another specific example, the technology may be employed to cancel a scan for wireless networks in response to a request to perform a Wi-Fi security or authentication operation. In this example, the canceled scan may be automatically restarted in response to completion of the Wi-Fi security or authentication operation. Although certain aspects of the technology are directed to virtualized networking and virtual Wi-Fi implementations, other aspects may be employed for other types of virtual or non-virtual networking.

Illustrative Devices/Operating Environments

FIG. 1 is a diagram of environment 100 in which aspects of the technology may be practiced. As shown, environment 100 includes computing devices 110, 120, and 130, as well as access point 140. As one non-limiting example, computing device 110 is configured to communicate with computing devices 120 and 130 as well as with access point 140 via wireless links 125, 135, and 145, respectively.

Computing device 110, along with computing devices 120 and 130, may be virtually any type of general- or specific-purpose computing device. For example, these computing devices may be user devices such as desktop computers, laptop computers, tablet computers, display devices, cameras, printers, or smartphones. Likewise, these computing devices may also be server devices such as application server computers, virtual computing host computers, or file server computers.

In the illustrated example, computing devices 110 and 120 are configured to communicate with each other over wireless link 125 while computing devices 110 and 130 are configured to communicate with each other over wireless link 135. As one example, wireless links 125 and 135 are Wi-Fi peer-to-peer links such as Wi-Fi Independent Basic Service Set (IBSS) links, Mesh Basic Service Set (MBSS) links, or Wi-Fi Direct links. However, there is no requirement for wireless links 125 and 135 to be either Wi-Fi links or peer-to-peer links. For example, wireless links 125 and 135 may be ZigBee links or Bluetooth links. In fact, wireless links 125 and 135 may employ any suitable air interface protocols or standards, or other communications protocols or standards, including those discussed above.

As illustrated, environment 100 also includes access point 140 which is linked to computing device 110 via wireless link 145. Access point 140 may be, for example, a Wi-Fi access point that is configured to provide a Basic Service Set (BSS) link between computing device 110 and a backend network such as the Internet or an intranet. However, access point 140 may alternately or additionally be any other type of device that provides access to a network or resource. For example, access point 140 may be a wireless repeater, a femtocell, an access point for a wide area network or metropolitan area network (e.g., a WiMax base station, a 4G base station, a Long Term Evolution (LTE) base station, etc.), or the like. In addition, access point 140 may be a stand-alone/hardware access point. Alternately, access point 140 may be a Software Enabled Access Point (SoftAP) or a Wi-Fi Direct Group Owner, e.g., operating on a general-purpose computing device or on a smart phone. As with wireless links 125 and 135, wireless link 145 may also employ any suitable communications protocols or standards.

As shown in environment 100, computing device 110 is configured to communicate with computing devices 120 and 130, as well as with access point 140, via wireless links 125, 135, and 145, respectively. As discussed above, the communications over these links and with these devices/access points may be conducted by computing device 110 via separate networks using Wi-Fi virtualization technology. As one example, computing device 110 may include only a single physical wireless network adapter but be configured with multiple virtual adapters and associated components that enable sharing of the single physical wireless network adapter. However, in other examples, computing device 110 includes more than one physical wireless network adapter.

In implementing Wi-Fi virtualization technology, computing device 110 may also include any number of virtual adapters and associated components of any one or more types. For example, computing device 110 may include both a virtual non-access point Wi-Fi station as well as a virtual Wi-Fi SoftAP. In this example, the non-access point Wi-Fi station and the Wi-Fi SoftAP may be separate Wi-Fi entities that appear to upper level applications as independent/separate media access control/physical layer interfaces. Computing device 110 may also employ any of the operational mode and network control operation management technology described herein to manage the operations of a shared network adapter. This management technology may, for example, enable computing device 110 to maintain separate connections to multiple devices. In one example, these separate connections are via separate networks but over a shared network adapter.

Although the above example is described in the context of a combining a virtual non-access point Wi-Fi station with a virtual Wi-Fi SoftAP on computing device 110, combinations of any other number or types of virtual adapters may be employed. For example, the described technology may be employed in conjunction with virtualization of multiple standards or protocols over the same network adapter. As one example, a Wi-Fi station and a WiMax station may be virtualized over a single physical radio. As another example, a WiMax station and a Bluetooth interface may be virtualized over a shared network adapter. As yet a further example, a Wireless Mesh Network adapter and a Wi-Fi adapter may be virtualized on the same computing device. These and other examples are possible implementations of the disclosed technology.

Figure 2:
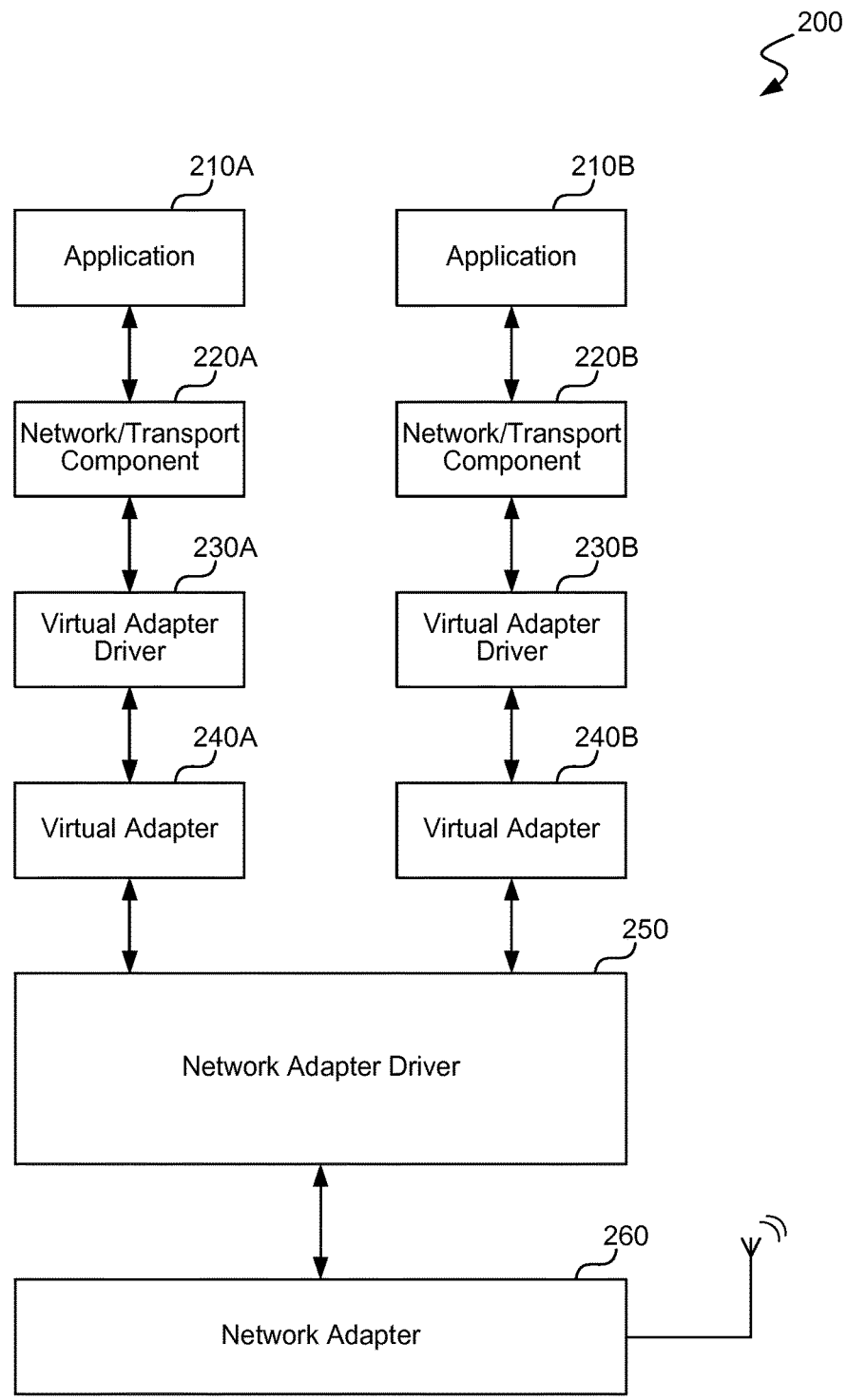
FIG. 2 is a block diagram illustrating functional blocks of a computing device in which aspects of the technology may be employed.

FIG. 2 is a block diagram illustrating functional blocks of computing device 200, which may be an embodiment of computing device 110, 120, or 130 of FIG. 1. As illustrated, computing device 200 includes applications 210A and 210B, network/transport components 220A and 220B, virtual adapter drivers 230A and 230B, virtual adapters 240A and 240B, network adapter driver 250, and network adapter 260. Although two sets of applications, network/transport components, virtual adapter drivers, and virtual adapters are illustrated in computing device 200, this is merely for clarity of illustration. Any number of applications may be associated with a particular virtual adapter path and any number of virtual adapters paths may be employed in a particular computing device.

Applications 210A and 210B may include any type of application that may receive or transmit data over a network or other communications medium, or be otherwise coupled to a communications medium. For example, applications 210A and 210B may include user-mode programs, kernel-mode processes, virtual machines, or the like. Likewise, applications 210A and 210B may also include programs or components that interface other devices or components to a communications medium.

In one typical example, applications 210A and 210B are configured to communicate with applications on other computing devices over a communications link, but may not be "aware of" or "concerned with" the underlying communications infrastructure. For example, the structure/organization of the underlying virtual and physical network adapters are typically abstracted away from, are not relevant to, and are not shared with applications 210A and 210B. In other words, applications 210A and 210B may be "unaware" that they are communicating via virtualized network adapters.

Applications 210A and 210B may be respectively interfaced to virtual adapters 240A and 240B via network/transport components 220A and 220B and virtual adapter drivers 230A and 230B. For example, network/transport components 220A and 220B may provide functionality typically associated with layers 3, 4, or higher of the Open System Interconnection (OSI) model. As one example, network/transport components 220A and 220B convert data from/for the applications to/from Transmission Control Protocol (TCP), User Datagram Protocol (UDP), and Internet Protocol (IP) packets. Optionally, network/transport components 220A and 220B may be part of an operating system.

In addition, virtual adapter drivers 230A and 230B may provide respective interfaces between network/transport components 220A and 220B and virtual adapters 240A and 240B. For example, virtual adapter drivers 230A and 230B may be adapted to provide interface, translation, and abstraction functionalities commonly associated with device drivers. As one example, virtual adapter drivers 230A and 230B may provide functionality typically associated with layers 2 and lower of the OSI model.

As shown, virtual adapters 240A and 240B are configured to interface applications 210A and 210B to lower levels interfaces such as network adapter driver 250 and network adapter 260. For example, virtual adapters 240A and 240B may each be a virtual non-access point Wi-Fi adapter, a virtual Wi-Fi SoftAP adapter, a WiMax adapter, a Bluetooth interface, a Wireless Mesh Network adapter, a ZigBee interface, or the like. However, the above examples are merely some of the many possible virtual adapters that may be employed with the disclosed technology. Further, each virtual adapter may couple computing device 200 to a separate network, e.g., to enable computing device 200 to maintain simultaneous connections with multiple networks over a shared network adapter. However, multiple virtual adapters on one computing device may alternately be configured to provide multiple connections to the same network. These and other possibilities are encompassed by the disclosed technology.

In computing device 200, network adapter driver 250 is configured to interface both virtual adapters 240A and 240B to network adapter 260, for example, by providing the interface, translation, and abstraction functionalities commonly associated with device drivers. In addition, network adapter driver 250 may also be configured to manage operational modes of network adapter 260, to prioritize requested network control operations, or to manage the execution of network control operations, e.g., by network adapter 260. Further details regarding these and other features are provided below in conjunction with FIG. 3.

In the example of computing device 200, network adapter 260 is adapted to interface computing device 200 to one or more wireless networks under the control of network adapter driver 250, e.g., by enabling transmission and reception of data to a wireless medium via an air interface. As one example, network adapter 260 is a physical Wi-Fi adapter embodied in what may commonly be referred to as a "wireless card." These and other examples of network adapter 260 may include a wireless receiver and a wireless transmitter that are respectively adapted to receive and transmit data to or from the wireless networks via the wireless medium.

In addition, network adapter 260 may be operated in a variety of operational modes, e.g., modes that define operational characteristics of the network adapter, define characteristics of network control operations being performed by the network adapter, define characteristics of data passing through the network adapter, or the like. These operational modes may also relate to management of the network adapter, management of a component of the network adapter (e.g., a wireless radio, buffer, or antenna), interfacing of the network adapter to one or more networks, offloading of tasks or functions by network adapter driver 250 or higher level components to the network adapter, or the like. As specific examples, operational modes may include a low packet loss/high reliability mode, a low latency mode, a discoverable mode (e.g., Wi-Fi Direct Listen State mode), a scanning mode, or the like. In addition, these and other operational modes may be associated with connection quality requirements (e.g., transmit reservations, latency requirements, jitter requirements, time-slot reservations, or bandwidth guarantees) or with active or background execution of particular network control operations.

While these operational modes typically provides functionality that is needed or otherwise beneficial to computing device 200, the handling of these operational modes will typically consume radio or other network adapter resources and, while executing, may reduce operational performance, reduce connection performance, increase channel management complexity, or the like. For example, execution of a Wi-Fi Direct Listen State mode may include "parking" a radio on a Wi-Fi Direct social channel which may be different than a channel used for other operational modes, network control operations, or data path traffic. As another example, execution of a high reliability or low latency mode may involve reserving air interface time slots at periodic intervals for sending or receiving packets for a specific virtual adapter, connection, or application. Likewise, a discoverable mode may involve performing active or background scans on periodic or other basis.

Network adapter 260 may also be adapted to perform all or part of various network control operations (e.g., operations that manage the network adapter or manage the interfacing of computing device 200 to one or more networks via network adapter 260). For example, these network control operations may include, but are not limited to:

enabling a network adapter (e.g., turning on a wireless radio, enabling a wireless access point functionality via a virtual adapter, or enabling a Wi-Fi Direct Group Owner functionality);
  disabling a network adapter (e.g., turning off the wireless radio, disabling a wireless access point functionality via a virtual adapter, or disabling a Wi-Fi Direct Group Owner functionality);
  resetting a network adapter;
  establish a network connection (e.g., connecting to a Wi-Fi network, connecting to a Wi-Fi Direct peer, negotiating a Wi-Fi Direct connection with the Wi-Fi Direct peer, negotiating security criteria, or communicating authentication credentials);
  disconnecting from a network (e.g., disconnecting from a Wi-Fi network or disconnecting from a Wi-Fi Direct peer);
  scanning (e.g., scanning for infrastructure networks, scanning for ad-hoc networks, or performing a Wi-Fi Direct discovery);
  performing a offload operation (e.g., performing a Wi-Fi Network List Offload (NLO) or performing a Wi-Fi Direct NLO); and
  monitoring for network activity (e.g., entering into a discoverable mode or entering into a Wi-Fi Direct Listen Mode).

Further, network control operations, including the above-listed examples, may be initiated in response to a user request. However, network control operations may also be initiated in response to requests from other entities (e.g., applications, network/transport components, virtual adapter drivers, virtual adapters, network adapter drivers, or remote devices).

In typical implementations, applications 210A and 210B, network/transport components 220A and 220B, virtual adapter drivers 230A and 230B, virtual adapters 240A and 240B, and network adapter driver 250 would be implemented in software (e.g., either as part of the operating system, as user-mode software, kernel-mode software, or as a combination of user-mode software and kernel-mode software) while network adapter 260 would be implemented in combinations of firmware and hardware. However, other implementations are possible. For example, functionalities described as implemented in network adapter 260 may be implemented in software (e.g., within network adapter driver 250 or another component) or functionalities described as performed by network adapter driver 250 may be implemented within network adapter 260. The disclosed technology may be implemented in these and other ways.

Figure 3:
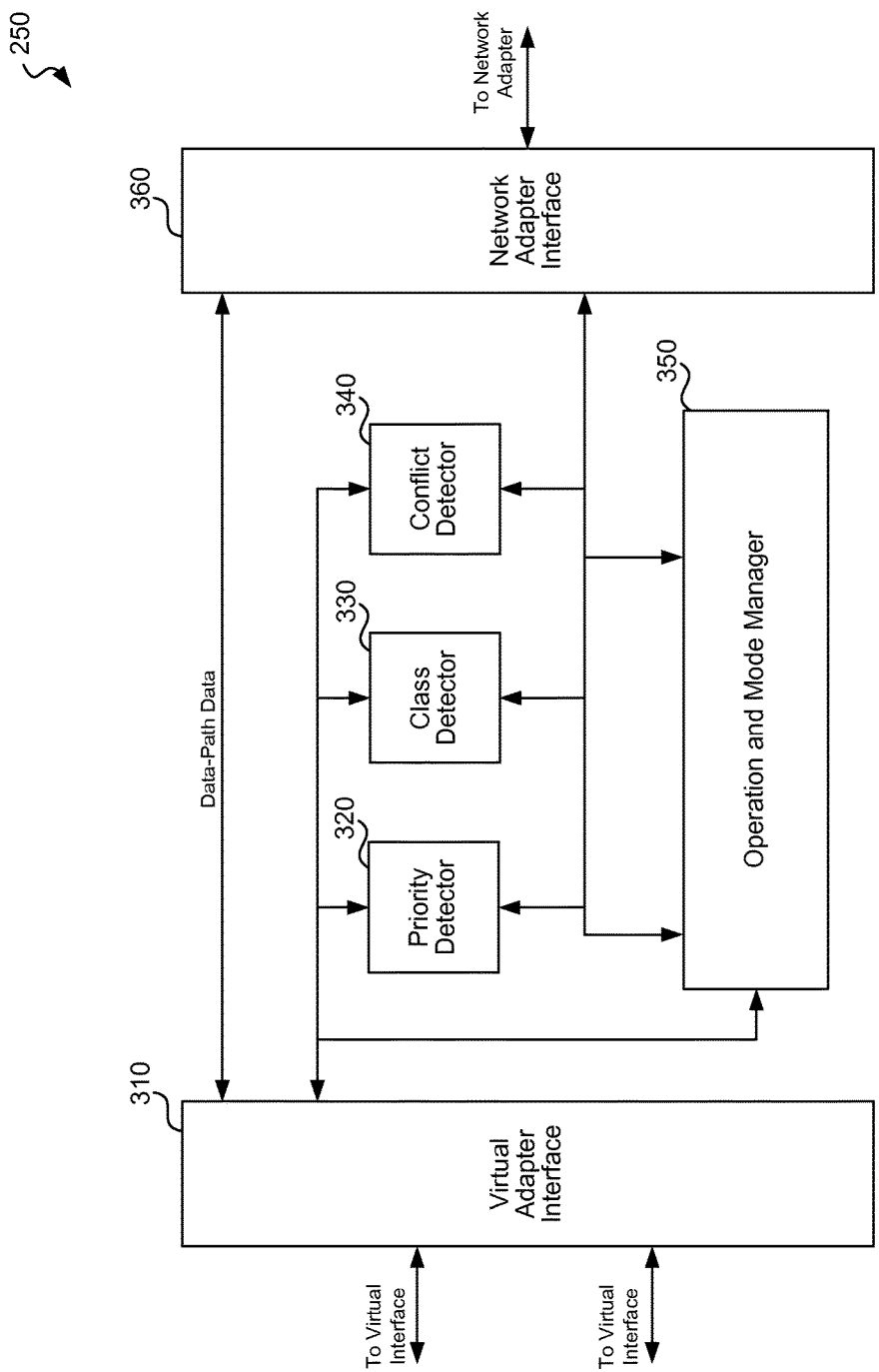
FIG. 3 is a block diagram illustrating functional blocks of network adapter driver 250 of FIG. 2.

FIG. 3 is a block diagram illustrating functional blocks of network adapter driver 250 of FIG. 2. As illustrated, network adapter driver 250 includes virtual adapter interface 310, priority detector 320, class detector 330, conflict detector 340, operation and mode manager 350, and network adapter interface 360. However, other network adapter drivers may include other, additional, or fewer components. As described above, network adapter driver 250 may be adapted to interface multiple virtual adapters to a network adapter such as network adapter 260.

Within network adapter driver 250, virtual adapter interface 310 may be adapted to provide a data-path interface to the virtual adapters. For example, virtual adapter interface 310 may provide this interface by forwarding data-path data between the virtual adapters and network adapter interface 360. Virtual adapter interface 310 may also be adapted to receive requests for network control operations and forward these requests to priority detector 320, class detector 330, conflict detector 340, and operation and mode manager 350 for processing. These requests may include user initiated network control operation requests. Alternately, other requests may be initiated by non-user entities (e.g., applications, network/transport components, virtual adapter drivers, or virtual adapters). However, both user initiated and non-user initiated requests may be received from any suitable source.

In the example of network adapter driver 250, priority detector 320 is adapted to assign or otherwise determine priority information for network control operations requests. In one implementation, the priority information includes a priority level, a priority scope, an indication of whether that network control operation can preempt other network control operations, and an indication of whether that network control operation can be preempted by other network control operations. However, other implementations of priority detector 320 may determine other types of priority information.

Continuing with this example, the priority level for an network control operation may include a numeric indicator of a priority value. For this example, a "0" may indicate that that network control operation has the highest possible priority value. This priority level may be determined from a preassigned table that maps priority values to types of network control operations. As one example, Table 1 of FIG. 4 illustrates one possible set of priority values for one possible set of network control operations.

While one set of priority values for one set of network control operations is described in the preceding paragraph and illustrated in FIG. 4, other suitable priority values and sets of network control operations may be employed. For example, priority values may be dynamically determined in another implementation. In this other implementation, the priority values may be determined based on feedback from previously executed network control operations or from any other suitable information.

Returning now to FIG. 3, the priority information for a network control operation may also include a priority scope indicating how that network control operation is to be prioritized against other network control operations. For example, the priority scope may indicate that that network control operation is to be prioritized against other network control operations requested via the same virtual adapter (e.g., virtual adapter scope), is to be prioritized against those requested via any of the multiple virtual adapters (e.g., global scope), or is to be prioritized against those requested via a subset of the multiple virtual adapters (e.g., group scope). However, other priority scopes are also possible.

Network adapter driver 250 may also include class detector 330 which may be adapted to assign or otherwise determine class information for requested network control operations. For example, this class information may include or serve as an indication of how long it is expected to take for that network control operation to execute. In this example, class detector 330 may classify network control operations as "long-running" or "standard" network control operations. For example, network control operations may be assigned to the long-running class if that network control operation is expected to take more than a threshold amount of time to complete. Likewise, class detector 330 may classify network control operations into the standard class if that network control operation is expected to take less than the threshold amount of time to complete.

However, other class managers may classify network control operations into any number of classes based on any suitable criteria. In one implementation, scan operations, connect operations, discover operations, negotiate operations, and listen operations are considered long-running network control operations while enable operations, disable operations, disconnect operations, start operations (e.g., a command/operation to start a long-running network control operation) are considered standard network control operations. However, other implementations may differ.

As shown in FIG. 3, network adapter driver 250 also includes conflict detector 340. In this example, conflict detector 340 may detect conflicts between network control operations and other network control operations or between network control operations and operational modes of the network adapter. In addition, conflict detector 340 may provide information regarding detected conflicts to operation and mode manager 350 to facilitate management of operational modes and network control operations. Further, conflict detector 340 may be adapted to detect conflicts between operational modes and network control operations for either one virtual adapter or across multiple virtual adapters, for example, based on the priority scope of a requested network control operation.

In one implementation, conflict detector 340 may detect a conflict based on predefined rules for executing network control operations, constraints associated with operational modes, or based on resources of the network adapter. For example, one implementation of the disclosed technology may include a rule that disallows execution of more than one long-running network control operation at a time. This example implementation may also include another rule that disallows the starting of a standard network control operation after network adapter driver 250 instructs the network adapter to execute a long-running network control operation until the network adapter acknowledges the instruction to start the long-running network control operation.

In this example, the conflict detector 340 would detect a conflict between network control operations if a long-running network control operation is requested while another long-running network control operation is being executed by the network adapter. Likewise, the conflict detector 340 of this example would also detect a conflict if a standard network control operation is requested after network adapter driver 250 instructed the network adapter to execute a long-running network control operation but before the network adapter has acknowledged the instruction.

Likewise, a conflict between a requested network control operation and an current operational mode of the network adapter may be detected if execution of the network control operation would violate requirements, guarantees, or other constraints associated with the current operational mode. For example, such constraints may be based on the resources (e.g., air interface time, radio tuning, or buffers) associated with executing that operational mode. In this example, a conflict may be detected if a currently executing operational mode is utilizing resources that would be needed to execute the requested network control operation (e.g., the network adapter may be unable service the requested network control operation while in the current operational mode).

In another example, a conflict may be detected if execution of a requested network control operation would involve changing a channel that the network adapter is using for an executing operational mode. As yet a further example, conflict detector 340 may detect a conflict based on the respective priorities of a current operational mode of the network adapter and of a requested network control operation (e.g., if a "low" priority network control operation is requested while the network adapter is executing a "high" priority operational mode). While various examples of conflicts have been described, other conflicts and other ways of detecting conflicts are possible.

In the example of network adapter driver 250, operation and mode manager 350 manages the operational modes and network control operations executed by the network adapter. For example, operation and mode manager 350 may control the execution of operational modes and network control operations based on information received from virtual adapter interface 310, priority detector 320, class detector 330, and conflict detector 340. In this example, operation and mode manager 350 is responsible for providing commands to the network adapter to preempt operational modes, to preempt network control operations, to start network control operations, and to restore operational modes.

Likewise, operation and mode manager 350 may be adapted to receive information from the network adapter (e.g., via network adapter interface 360) regarding the status of the operational modes and network control operations. Operation and mode manager 350 may also be responsible for implementing rule-based prioritization of requested network control operations relative to other network control operations and for providing commands to the network adapter to execute prioritized network control operations. In one example implementation, operation and mode manager 350 may prioritize requested network control operations according to the following rule set:

prioritize of network control operations, either for individual virtual adapters or for multiple virtual adapters interfaced to a shared network adapter (e.g., based on the priority scopes of the requested network control operations);

cancel preemptible lower priority level network control operations in order to execute higher priority level network control operations;

cancel preemptible long-running network control operations in favor of later requested long-running network control operations if the later requested network control operation is associated with a preempt other network control operations attribute;

limit the number of long-running network control operations that may execute at one time (e.g., limit concurrent execution long-running network control operations to one per underlying network adapter or one per wireless radio);

disallow preemption of standard network control operations;

queue requested network control operation that cannot be executed on receipt;

queue standard network control operations after a command has been issued to the network adapter to start a long-running network control operation until an acknowledgement of the command is received;

execute standard network control operations in response to an acknowledgement indicating that a long-running network control operation has been started (e.g., executing the standard network control operation concurrently with the long-running network control operation);

serially execute standard network control operations on first-come-first-served basis;

execute queued network control operation in response to a completion of a prior network control operation (e.g., based on priority, class, or order of requests); and execute requested network control operations on receipt if there are no conflicts.

While the above list includes rules for one example implementation of operation and mode manager 350, it is to be recognized that other implementations may include other, additional, or fewer rules. In other words, any suitable rule or set of rules may be employed.

In addition to controlling execution of network control operations relative to other network control operations, operation and mode manager 350 may also be adapted to control execution of network control operations based on current operational modes of the network adapter. For example, operation and mode manager 350 may be adapted to selectively preempt operational modes of the network adapter to execute certain network control operations. Operation and mode manager 350 may also be adapted to defer, queue, or otherwise delay execution of a requested network control operations until the current operational mode completes, or execute a requested network control operation while the network adapter is maintained in the current operational mode. Operational mode preemption rules may also be defined in a table, such as Table 2 of FIG. 5.

However, other rules, rule sets, or tables may be employed for other implementations. For example, preemption of operational modes may also be based on priority information associated with the current operational mode and with the requested network control operation. In addition, mode information of the to-be-preempted operational mode may be stored as part of a preemption process, e.g., for later use in restoring the mode. As one example, this mode information may include variables, data, or other state information for the to-be-preempted operational mode. Continuing with this example, operation and mode manager 350 may also be adapted to restore (e.g., resume, start, restart, reload, change to an active state) the preempted operational mode upon completion of the network control operation that preempted the operational mode. Also, the preempted operational mode may be restored using the stored mode information.

The optional restoration of a preempted operational mode may also be performed automatically by operation and mode manager 350, for example, in response to an indication from the network adapter. This indication may represent completion of the network control operation that preempted the operational mode. However, other variations are possible. For example, a preempted operational mode may be restored in response to the preempting network control operation reaching a particular point or a certain state. In yet another example, the preempted operational mode may be automatically restored by the network adapter (e.g., if the preemption command from operation and mode manager 350 included an implicit or explicit instruction for the network adapter to automatically restore preempted operational mode).

Within network adapter driver 250, network adapter interface 360 is adapted to interface network adapter driver 250 to a network adapter. For example, network adapter interface 360 may be adapted to pass data between virtual adapter interface 310 and the network adapter, and be adapted to control the network adapter based on the output of operation and mode manager 350. Network adapter interface 360 may also be adapted to receive responses, acknowledgement, and other indication from the network adapter and provide them to operation and mode manager 350 or to virtual adapter interface 310, priority detector 320, class detector 330, or conflict detector 340.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 6:
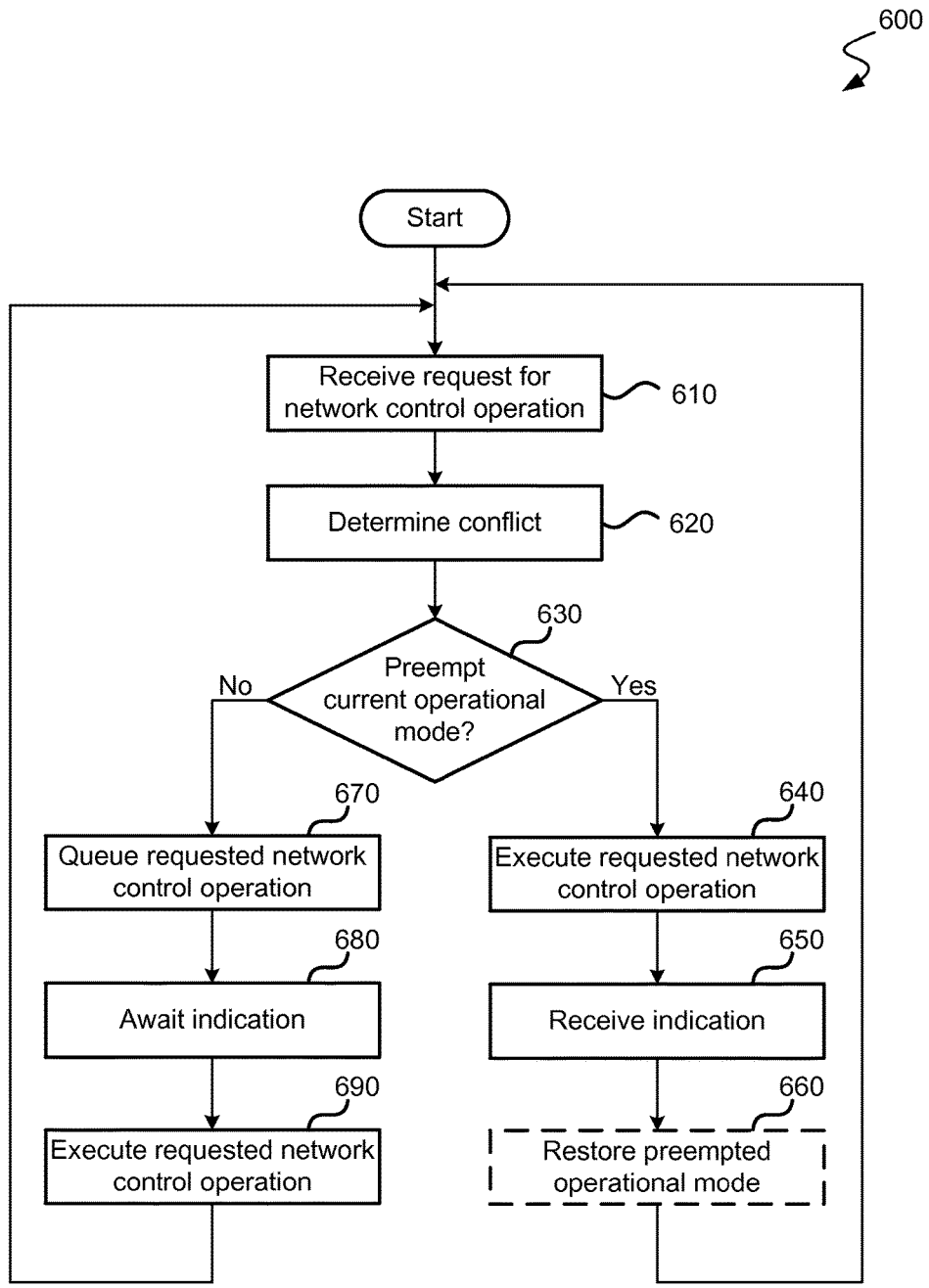
FIG. 6 is a logical flow diagram illustrating a process for managing operational modes of a network adapter according to aspects of the technology.

FIG. 6 is a logical flow diagram illustrating process 600 for managing operational modes of a network adapter. Process 600 begins at 610 where a request for a network control operation is received. As one example, the request may be a user initiated request received via an application associated with a virtual adapter. However, user initiated or other requests may be received in this or any other suitable way.

Processing continues at 620 where it is determined that execution of the requested network control operation would conflict with a current operational mode of the network adapter. As one example, this determination is performed by conflict detector 340. Although not shown in FIG. 6, if it determined that execution of the requested network control operation would not conflict with the current operational mode, the requested network control operation may be executed without further checks, or may be executed by way of process 700 of FIG. 7.

Processing then flows to 630 where it is determined whether to preempt the current operational mode with the requested network control operation. In one implementation, this determination may be based on rules from an operational mode preemption table, other rules, priority information for the current operational mode and the requested network control operation, or the like.

In response to a determination that the current operational mode is to be preempted, processing flows to 640 where the current operational mode is preempted by the requested network control operation. As one example, this preemption may include transmitting a command to perform the requested network control operation from operation and mode manager 350 to network adapter 260. As discussed above, this preemption may include saving mode information for the to-be-preempted operational mode, or may simply involve pausing the to-be-preempted operational mode without saving mode information or canceling the to-be-preempted operational mode.

From 640, processing flows to 650 where an indication is received. In one implementation, this indication represents completion of the requested network control operation and is received by operation and mode manager 350 from network adapter 260. However, this indication may alternately indicate that the requested network control operation has reached a particular point or a certain state (e.g., a point or state at which the preempting network control operation would no longer conflict with the preempted operational mode). As another alternative, the indication may be handled within network adapter (e.g., without providing an indication to network adapter driver 250).

Processing then optionally flows to 660 where the preempted operational mode is restored. In one example, the preempted operational mode is restored by operation and mode manager 350 via transmission of a restore command to network adapter 260. From 660, processing returns to 610. If 660 is not implemented in a particular system, processing may instead flow from 650 to 610.

If, at 630, it is determined that the current operational mode is not to be preempted, processing flows to 670 where the requested network control operation is queued for later execution. From 670 processing flows to 680 to await an indication that the requested network control operation can be executed. For example, this indication may be an indication that the current operational mode has completed or that the requested network control operation would no longer conflict with the current operational mode. Once this indication is received, the requested network control operation may be executed before processing returned to 610.

Figure 7:
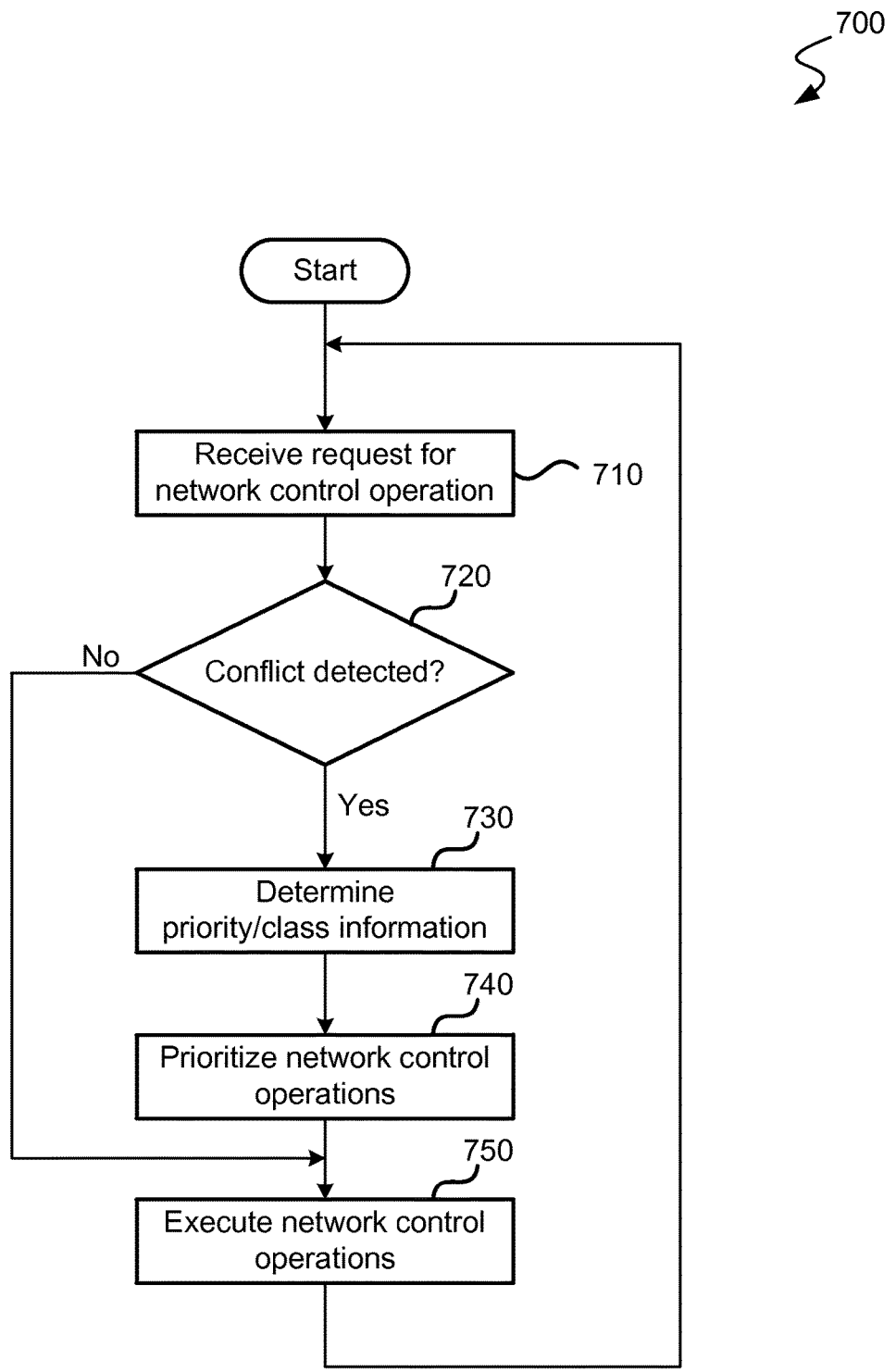
FIG. 7 is a logical flow diagram illustrating a process for prioritizing and performing requested network control operations according to aspects of the technology.

FIG. 7 is a logical flow diagram illustrating process 700 for prioritizing and performing requested network control operations. Process 700 begins at 710 where a request for an network control operation is received. As with process 600, the request may be a user initiated or non-user initiated request. Following 710, processing flows to 720 where it is determined whether execution of the requested network control operation would conflict with an executing network control operation. As one example, this determination is performed by conflict detector 340.

In response to detection of a conflict, processing flows to 730 where priority/class information for the requested network control operation, the executing network control operation, and any other requested network control operations are determined. As discussed above, the priority/class information may be determined from a table, dynamically determined, or determined in any other suitable manner. Once the priority/class information is determined, processing flows to 740.

At 740, the requested network control operation, the executing network control operation, and any other requested network control operations are prioritized based on the determined priority/class information, prioritization rules, preemption rules, or the like. This prioritization may also be performed by operation and mode manager 350 or another suitable component. Once the network control operations are prioritized, processing flows to 750 where the network control operations are executed based on the prioritization. This execution may include preempting the executing network control operation, ordering/reordering queued network control operations, concurrently executing all or parts of multiple network control operations, or the like.

If, at 720, it is determined that the requested network control operation would not conflict either with a current operational mode or with an executing network control operation, processing may flow directly from 720 to 750 so that the requested network control operation may be executed. From 750, processing returns to 710.

Figure 8:
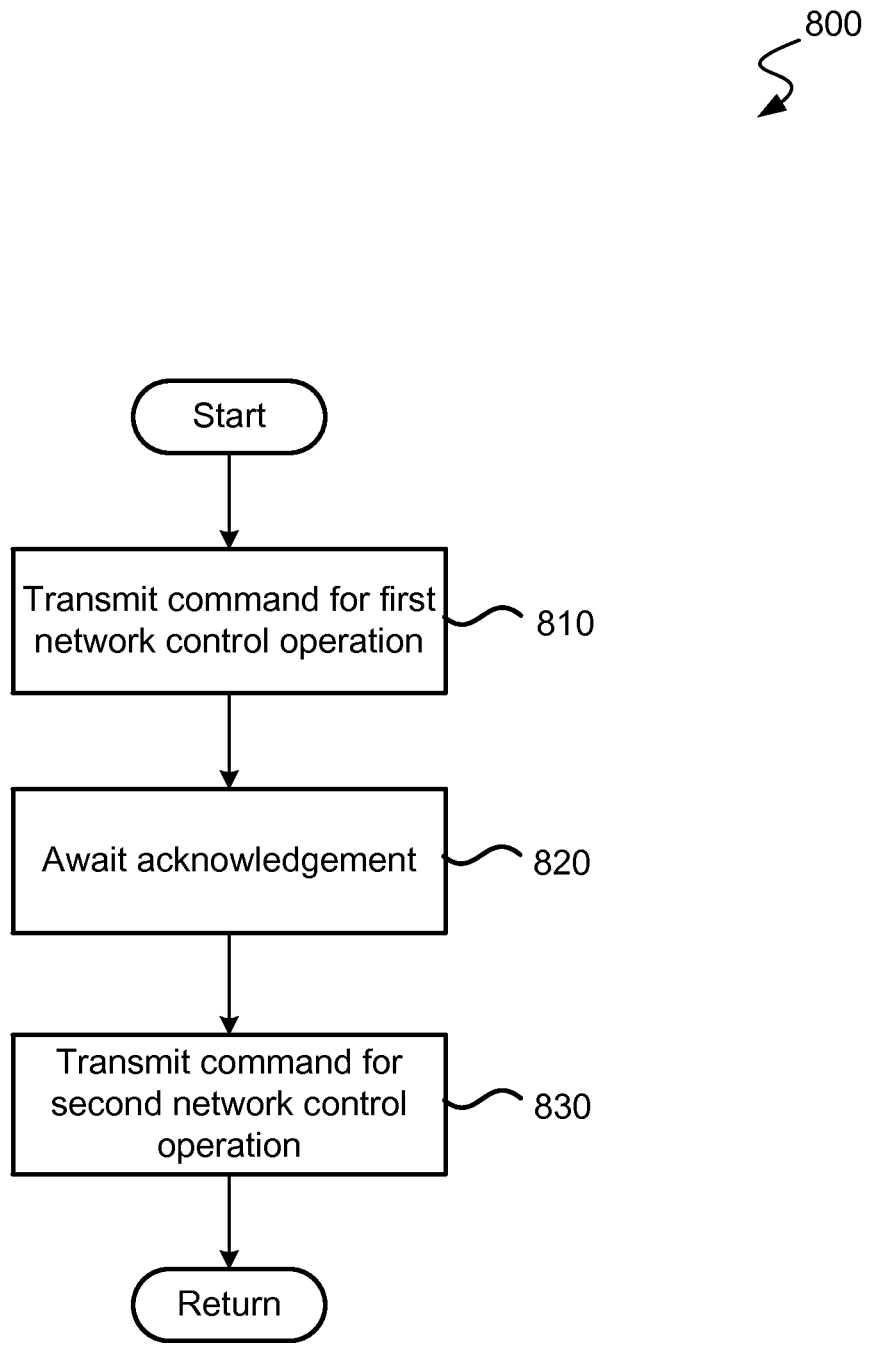
FIG. 8 is a logical flow diagram illustrating a process for managing concurrent execution of multiple network control operations according to aspects of the technology.

FIG. 8 is a logical flow diagram illustrating process 800 for managing concurrent execution of multiple network control operations. Process 800 may, but is not required to be, a subprocess of 640 of process 600, of 690 of process 600, or of 750 of process 700. Process 800 begins at 810 where a command is transmitted (e.g., from operation and mode manager 350 to network adapter 260) to start a first network control operation. As one example, the first network control operation may be a long-running network control operation that may be executed concurrently with standard network control operations. Following the transmission of the command, network adapter 260 may start the first network control operation then transmit an acknowledgement, for example, back to operation and mode manager 350.

At 820, an acknowledgement is received. For example, the acknowledgement may be an indication that the command for the first network control operation has been received, that the first network control operation has been started, that the first network control operation has reached a particular point, that the first network control operation is in a certain state, or the like. Processing then proceeds to 830 where a command for a second network control operation is transmitted, for example, to network adapter 260. As one example, the second network control operation may be a standard network control operation, rather than a long-running network control operation. From 830, processing returns to the calling process.

Illustrative Devices/Operating Environments

Figure 9:
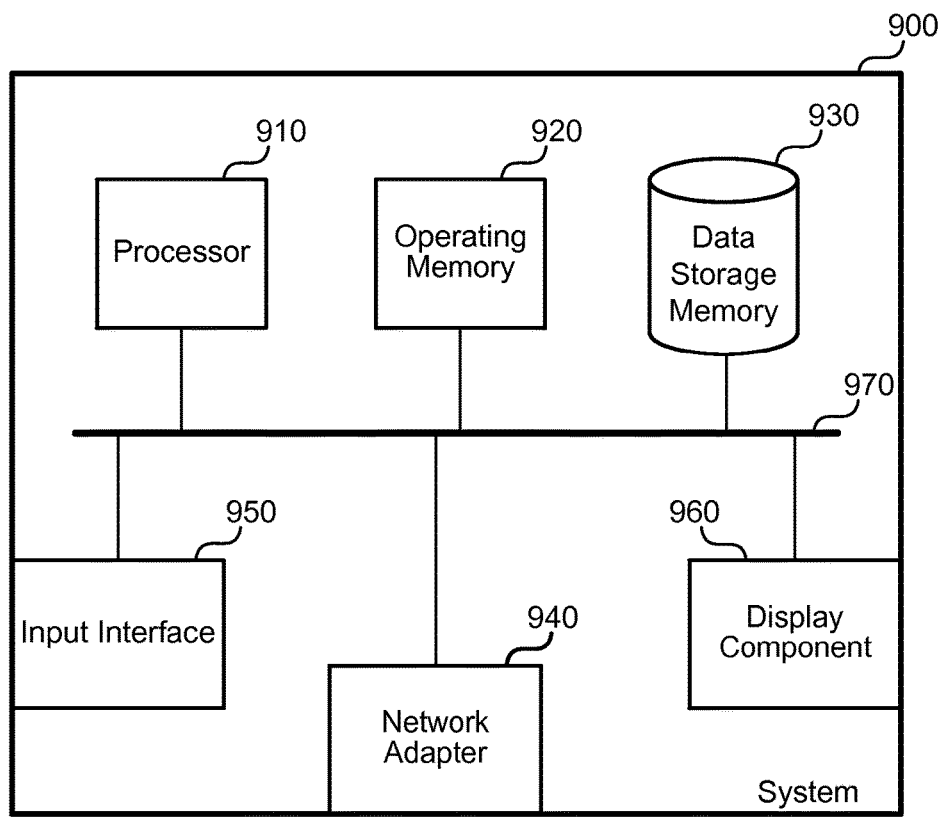
FIG. 9 is a block diagram illustrating example hardware components of a computing device in which aspects of the technology may be practiced.

FIG. 9 is a high-level illustration of example hardware components of computing device 900, which may be used to practice various aspects of the technology. For example, computing device 900 may be employed to perform process 600 of FIG. 6, process 700 of FIG. 7, or process 800 of FIG. 8. Computing device 900 may also be an embodiment of computing device 200 of FIG. 2. As shown, computing device 900 includes processor 910, operating memory 920, data storage memory 930, network adapter 940, input interface 950, and display component 960. These aforementioned components may be interconnected by bus 970.

As with computing device 200, computing device 900 may be virtually any type of general- or specific-purpose computing device. For example, computing device 900 may be a user device such as a desktop computer, a laptop computer, a tablet computer, a display device, a camera, a printer, or a smartphone. Likewise, computing device 900 may also be server device such as an application server computer, a virtual computing host computer, or a file server computer.

Computing device 900 includes at least one processor 910 configured to execute instructions, such as instructions for implementing the above-described processes or technology. The aforementioned instructions, along with other data (e.g., datasets, metadata, operating system instructions, etc.), may be stored in operating memory 920 and/or data storage memory 930. In one example, operating memory 920 is employed for run-time data storage while data storage memory 930 is employed for long-term data storage. However, each of operating memory 920 and data storage memory 930 may be employed for either run-time or long-term data storage. Each of operating memory 920 and data storage memory 930 may also include any of a variety of data storage devices/components, such as volatile memories, semi-volatile memories, non-volatile memories, random access memories, static memories, disks, disk drives, caches, buffers, or any other media that can be used to store information. However, operating memory 920 and data storage memory 930 specifically do not include or encompass communications media, any communications medium, or any signals per se.

Also, computing device 900 may include or be coupled to any type of computer-readable media such as computer-readable storage media (e.g., operating memory 920 and data storage memory 930) and communication media (e.g., communication signals and radio waves). While the term computer-readable storage media includes operating memory 920 and data storage memory 930, this term specifically excludes and does not encompass communications media, any communications medium, or any signals per se.

Network adapter 940 maybe an embodiment of network adapter 260 of FIG. 2.

Computing device 900 also includes input interface 950, which may be configured to enable computing device 900 to receive input from users or from other devices. In addition, computing device 900 includes a display component 960, which may be configured to render displays. In one example, display component 960 includes a frame buffer, graphics processor, graphics accelerator, or a virtual computing host computer and is configured to render the displays for presentation on a separate visual display device (e.g., a monitor, projector, virtual computing client computer, etc.). In another example, display component 960 includes a visual display device and is configured to render and present the displays for viewing.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A method of managing operational modes of a network adapter, comprising:

receiving a user initiated request for a network control operation associated with a first virtual adapter, the first virtual adapter being from a plurality of virtual adapters that are each interfaced to a wireless medium via the network adapter, and the user initiated request being a request from the user to manage the network adapter or to manage the interfacing of network adapter to one or more networks;

determining a conflict between executing the requested network control operation and a current operational mode of the network adapter, the current operational mode of the network adapter being associated with a second virtual adapter of the plurality of virtual adapters;

determining that the requested network control operation is associated with a priority level that allows preemption of the current operational mode;

in response to determining the conflict and determining that the requested network control operation is associated with the priority level that allows preemption of the current operational mode, canceling or deferring the current operational mode of the network adapter;

executing the requested network control operation; and in response to a completion of the execution of the requested network control operation, restarting or resuming the canceled or deferred operational mode of the network adapter.

2. The method claim 1, further comprising:

receiving another user initiated request for another network control operation;

determining that executing the other requested network control operation would not conflict with the restarted or resumed operational mode; and in response to determining that executing the other requested network control operation would not conflict with the restarted or resumed operational mode, executing the other requested network control operation while the network adapter is in the restarted or resumed operational mode.

3. The method of claim 1, wherein the operational mode is associated with a connection quality requirement, a network control operation, or with background execution of a network control operation.

4. The method of claim 1, wherein the requested network control operation is a request to turn on a wireless radio of the network adapter, turn off the wireless radio of the network adapter, connect to a wireless network, disconnect from the wireless network, disable a wireless access point functionality provided via a virtual adapter, enable the wireless access point functionality provided via the virtual adapter, scan for networks, or scan for wireless devices.

5. The method of claim 1, wherein the conflict representing an inability of the network adapter to execute the requested network control operation while concurrently servicing the current operational mode without changing a channel over which the network adapter is communicating.

6. A computer-readable storage medium having instructions stored therein for performing a process of managing operational modes of a network adapter, the process comprising:

receiving a user request for a network control operation that manages the network adapter or that manages the interfacing of the network adapter to one or more networks;

determining that the requested network control operation would conflict with a current operational mode of the network adapter;

transmitting a command indicative of preemption of the current operational mode of the network adapter;

initiating the requested network control operation; and in response to a completion of the requested network control operation, transmitting a command to restore the preempted operational mode.

7. The computer-readable storage medium of claim 6, wherein the process further comprises:

determining that the requested network control operation is associated with a priority level that allows preemption of the current operational mode.

8. The computer-readable storage medium of claim 6, wherein:

the command indicative of the preemption of the current operational mode is a command to cancel the current operational mode or a command to defer execution of the current operational mode; and the command to restore the preempted operational mode is a command to restart the preempted operational mode or a command to resume execution of the preempted operational mode.

9. The computer-readable storage medium of claim 6, wherein the requested network control operation is from a set of network control operations that includes performing a Wi-Fi Network List Offload (NLO) operation, entering into a Wi-Fi Direct Listen Mode, and negotiating a Wi-Fi Direct connection with a Wi-Fi Direct peer.

10. The computer-readable storage medium of claim 6, wherein the requested network control operation is from a set of network control operations that includes connecting to a wireless network, disconnecting from the wireless network, starting an access point functionality, and stopping the access point functionality.

11. The computer-readable storage medium of claim 6, wherein the requested network control operation is a user initiated request from a set of user initiated requests, the set of user initiated requests including a user initiated request to establish a network connection, a user initiated request to disconnect from a network, and a user initiated request to scan for networks.

12. The computer-readable storage medium of claim 6, wherein the current operational mode includes a mode associated with performance of another network control operation, a mode associated with a connection quality requirement, or a mode associated with background execution of a network control operation.

13. The computer-readable storage medium of claim 6, wherein the determination that the requested network control operation would conflict with a current operational mode of the network adapter is based at least in part on respective priorities associated with the current operational mode of the network adapter and of the requested network control operation.

14. The computer-readable storage medium of claim 6, wherein the process further comprises:

receiving another user request for another network control operation;

determining that the other requested network control operation would not conflict with the restored operational mode; and initiating the other requested network control operation while the network adapter is in the restored operational mode.

15. The computer-readable storage medium of claim 6, wherein the instructions form part of an operation and mode manager component of a network adapter driver.

16. A computing device for managing operational modes of a network adapter, comprising:

the network adapter, wherein the network adapter is adapted to interface the computing device to one or more wireless networks, to perform at least portions of multiple network control operations, and to operate in any operational mode of a set of operational modes; and a memory and a processor that are respectively adapted to store and execute instructions that:

receive a user request for a network control operation that manages the network adapter or that manages the interfacing of the computing device to at least one of the one or more wireless networks;

determine that the requested network control operation would conflict with a current operational mode of the network adapter; and control preemption of the current operational mode of the network adapter with the requested network control operation, the preemption including execution of at least a portion of the requested network control operation by the network.

17. The computing device of claim 16, wherein the instructions that control restoration of the preempted operational mode provide an implicit or explicit instruction to the network adapter to automatically restore the to-be-preempted operational mode in response to the completion of the requested network control operation.

18. The computing device of claim 16, wherein the instructions also:

receive another request for another network control operation;

determine that the other requested network control operation would not conflict with the restored operational mode; and initiate the other requested network control operation while the network adapter is in the restored operational mode.

19. The computing device of claim 16, wherein:

the preemption further includes storing mode information of the current operational mode; and the restoration includes restoring the preempted operational mode from the stored mode information.

20. The computing device of claim 16, wherein:

the requested network control operation is a user initiated request from a set of user initiated requests, the set including a user initiated request to establish a network connection, a user initiated request to disconnect from a network, a user initiated request to scan for available networks, a user initiated request to start an access point functionality, and a user initiated request to stop the access point functionality; and the current operational mode is from a set of operational modes that includes a mode associated with performance of another network control operation, a mode associated with a connection quality requirement, and a mode associated with background execution of another network control operation.

* * * * *